C. Page,
Car Replacer,
Nº 21,696. Patented Oct. 5, 1858.

UNITED STATES PATENT OFFICE.

CHARLES PAGE, OF WEST MERIDEN, CONNECTICUT.

WINDLASS FOR MOVING CARS AND LOCOMOTIVES WHEN WITHOUT STEAM.

Specification of Letters Patent No. 21,696, dated October 5, 1858.

*To all whom it may concern:*

Be it known that I, CHARLES PAGE, of West Meriden, in the county of New Haven and State of Connecticut, have invented a new and useful Improvement in the Method of Moving Locomotives and other Cars on a Railroad-Track, for Temporary Purposes, Without Steam; and I do hereby declare that the following is a full, clear, and exact description of the construction, character, and operation of the same, reference being had to the accompanying drawings, which make a part of this specification, in which—

Figure 1:
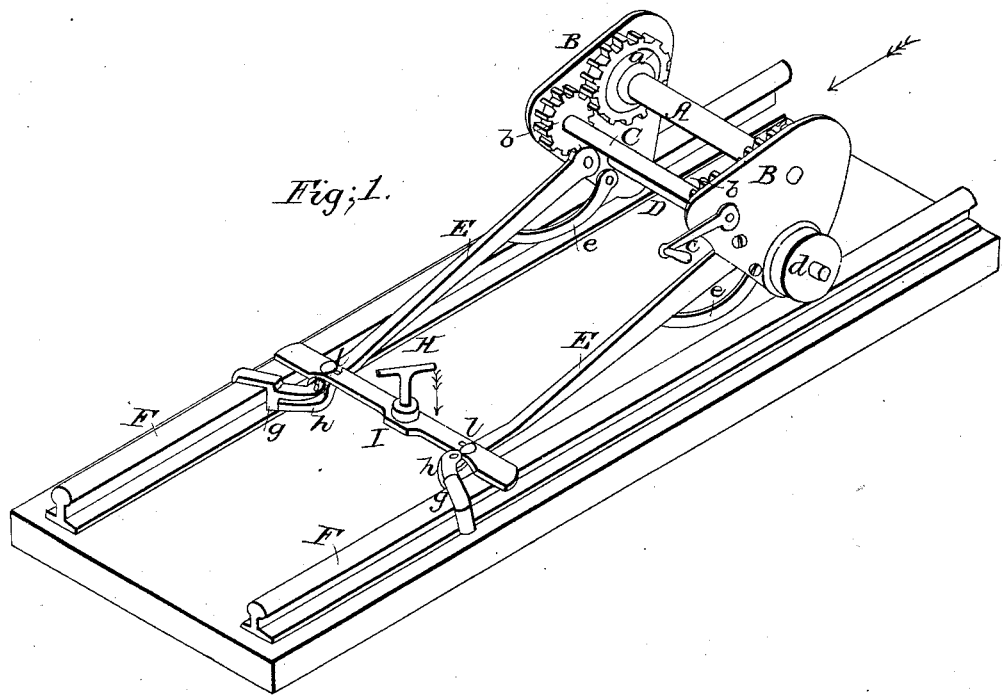
Figure 2:
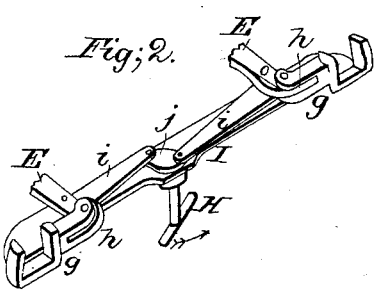

Figure 1, is a perspective view of the whole apparatus. Fig. 2, is a perspective view of the manner of clamping the parts to the rails by the operation of the double jointed levers, and jaws.

My improvement consists in arranging, and connecting a windlass, by means of clamps, or jaws, to any portion of the rails of railroad tracks, so as to form, or afford, by means of cranks, an apparatus, or machine, for moving locomotives and other cars, on rail road tracks, without steam.

I make the windlass, A, with two gear-wheels, $a$ and $a$, one on each end, as shown in Fig. 1, of any desired size and strength, and have its journals work in bearings in two plates, B, and B, Fig. 1. I make a similar shaft, C, carryng two small gear wheels, or pinions, $b$ and $b$, (of any desired proportion to the wheels, $a$ and $a$,) which work into the wheels, $a$, and $a$, and, also have their journal bearings in the plates, B, and B, as shown in Fig. 1. And on each end of this shaft, C, I place a crank, as shown at $c$. And another shaft and pinions may be added, so as to change the power, at pleasure, by shifting the cranks.

In the lower portion of these plates, B, and B, I have the bearings of the journals of another shaft, or axle, D, which sustains two truck wheels, (one of which is seen at $d$,)-to enable me to move the machine, or apparatus along the track, with facility, when desired. To each of these plates, B, and B, I firmly attach, or secure, a bar, as E, and E, kept uniformly parallel by braces, $e$, and $e$, as shown in Fig. 1, (or by other means.) To the other end of each of these bars, C, and C, I joint a clamp, or jaws, as $g$, and $g$, Figs. 1, and 2, which are fitted to pass loosely onto the rails, F, and F, when they are at right angles to the rails, but will bite, or clamp, the rail, when oblique, as shown in Fig. 1. These clamps, or jaws, $g$, and $g$, are thrown into the positions of right angles to the rails by small springs, $h$, and $h$, Figs. 1, and 2,—and they are forced to their oblique positions, as shown in Fig. 1, by turning the handle, H, (in the direction indicated by the dart,) which operates the two levers, $i$, and $i$, by means of the double joint, $j$, as shown in Fig. 2.

The handle, H,—center piece of the double joint, $g$,—and bars, E, and E, are attached to a cross-bar, I, the ends of which rest on the rails as shown in Fig. 1. The bars, E, and E, are attached to the cross-bar, I, by screws working in slots, as shown at $l$, and $l$, Fig. 1, so that the levers, $i$, and $i$, (which are attached to the bars, E, and E,) when elongated by turning the handle, H, may force them outward to cause the oblique position of the clamps, or jaws, $g$, and $g$, as represented in Fig. 1.

To use this apparatus, I turn the handle, H, parallel with the cross bar, I, (which will bring the clamps, or jaws, also parallel,)— place the wheels, $d$, and cross-bar, I, on the rails, at any desired location, and turn the handle, H, at right angles with the cross-bar, I, which will force the jaws, $g$, and $g$, into the oblique positions shown in Fig. 1, ready for use. I then attach one end of a rope, or chain, to the locomotive, or other car, to be moved, and the other end to the windlass, or shaft, A, and revolve the cranks, $c$, when the locomotive, or other car, will be drawn toward the apparatus, in the direction indicated by the dart.

The particular use of this apparatus is for moving locomotives, and other cars, in, and about, stations, engine houses, &c., when it would be inconvenient, and expensive, to get up steam, or when there is no locomotive at hand, as in moving loaded cars to, and from, the storehouse, or other place of deposite, for loading and unloading, in the absence of a locomotive. But, it might, also, be found very useful in drawing cars onto the track, or out of a snow-bank &c.

I am aware that the windlass, and its gearing, is old, and, that jaws, or clamps, to bite on a stationary form have long been used;—and that double levers have often been expanded longitudinally, by the double joint; I, therefore, do not claim either of these, as such, as my invention; but

What I claim, as my invention, and desire to secure by Letters Patent, is—

5 The combination of the windlass, (A,) with the jaws, (*g*, and *g*,) and the levers, (*i*, and *i*,) when connected, arranged, and made to produce the result, by the means, and in the manner, substantially, as herein described.

CHARLES PAGE.

Witnesses:
FRANK SPALDING,
R. FITZGERALD.